United States Patent [19]

Beesley

[11] 4,443,944
[45] Apr. 24, 1984

[54] SPRING RETRACTED TAPE MEASURE

[75] Inventor: Phillip G. Beesley, Guisborough, England

[73] Assignee: Howard Wall Limited, London, England

[21] Appl. No.: 411,599

[22] Filed: Aug. 26, 1982

[30] Foreign Application Priority Data

Aug. 27, 1981 [GB] United Kingdom ............... 8126221

[51] Int. Cl.³ .............................................. G01B 3/10
[52] U.S. Cl. ..................................... 33/138; 242/84.8
[58] Field of Search ............................. 33/138, 137 R; 242/84.8

[56] References Cited

U.S. PATENT DOCUMENTS 1,880,705 10/1932 Bitner .................................... 33/138
1,945,842 2/1934 Witchger .............................. 33/138
4,068,383 1/1978 Krebs .................................... 33/138

FOREIGN PATENT DOCUMENTS 1336553 11/1973 United Kingdom ................. 33/138

Primary Examiner—Willis Little
Attorney, Agent, or Firm—Fulwider, Patton, Rieber, Lee & Utecht

[57] ABSTRACT

In a spring retracted tape measure in which the tape measure is retracted into a housing (1,2) onto a spring biassed drum (3), the ratchet is constituted by teeth (23) formed on the housing and detents (27) on flexible arms (24) on the drum which bias the detents into contact with the teeth (23). A portion (20) of the housing is resiliently connected to the rest of the housing, and can be depressed inwardly to engage the flexible arms (24) thus disengaging the detents (27) from the teeth (23) to permit the tape to be wound in.

14 Claims, 4 Drawing Figures

SPRING RETRACTED TAPE MEASURE

BACKGROUND OF THE INVENTION

This invention relates to a tape measure of the type in which a measuring tape is wound around a drum mounted for rotation within a casing, the tape being adapted to be withdrawn from the casing for measuring purposes.

In known tape measures of this type there is usually a spring adapted to oppose the withdrawal of the tape from the casing and acting to return the tape to the casing. A ratchet mechanism may be provided to prevent the return of the tape measure to the casing until required, the ratchet mechanism then being disengaged to enable the spring to rewind the tape into the casing.

In known prior tape measures of this type, the ratchet mechanism commonly comprises a spring-biased member carrying a pawl which engages with a toothed portion of the reel on which the tape is wound and which terminates in a button outside the casing so that the button may be depressed in order to release the ratchet mechanism by withdrawing the pawl from the toothed portion of the reel. The provision of such an arrangement constitutes a significant part of the cost of manufacturing such a tape measure.

OBJECT OF THE INVENTION

The object of the present invention is to provide a tape measure having a simple ratchet release mechanism that is cheap to produce.

BRIEF SUMMARY OF THE INVENTION

According to this invention there is provided a tape measure comprising: a casing formed by a first shell and a second shell; a drum mounted for rotation within the casing; a measuring tape wrapped around the drum and adapted to be withdrawn from the casing; a spring means adapted to rotate the drum to retract the tape after it has been at least partly withdrawn from the casing; and a ratchet mechanism comprising cooperating ratchet members, at least a first one of the ratchet members being on the first shell and at least one further ratchet member being on the drum to engage with the first ratchet member, and a disengagement means adapted to move each further ratchet member from a position in which it engages the first ratchet member to a retracted position in which there is no such engagement to enable rotation of the drum by the spring means.

Preferably the said first ratchet member comprises a plurality of teeth arranged on the first shell in a circle substantially co-axial with the axis of rotation of the drum.

Conveniently each said further ratchet member comprises at least one arm resiliently mounted at one end thereof on the drum, each arm having a free end having an abutment to engage the first ratchet member.

Suitably there are two said arms, the respective projections of the arms onto the plane of rotation of the drum being parallel to one another.

Advantageously the disengagement means comprises an area of the first shell bounded by a flexible region of the first shell and movable with respect to the remainder of the first shell, to engage each further ratchet member and move it to a position in which there is no engagement between the first and further ratchet members.

Preferably the said flexible region is moulded integrally with, but of reduced thickness relative to, the remainder of the first shell, and the flexible region is annular and is substantially co-axial with the axis of rotation of the drum.

Suitably the said engagement means includes a boss member integrally formed with said area of the first shell and extending towards the further ratchet member and adapted to abut and to move the further ratchet member when the said area is moved towards the further ratchet member.

Preferably the movement of the or each ratchet member is towards the plane of rotation of the drum.

Conveniently the casing is sufficiently flexible to allow the first and second shells to be snap-fitted together.

DESCRIPTION OF PREFERRED EMBODIMENTS

Figure 1:
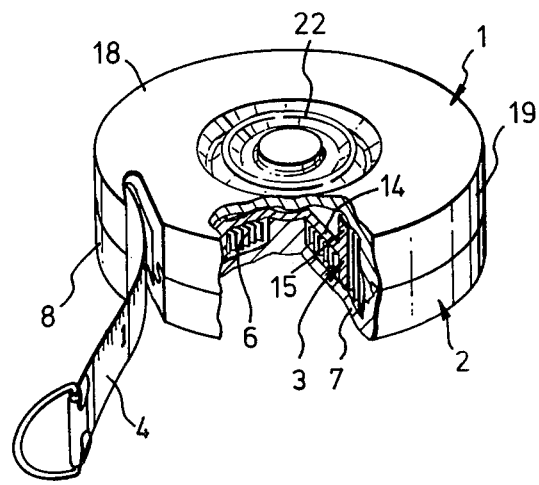
FIG. 1 is a perspective view of the tape measure, with parts cut away.
Figure 2:
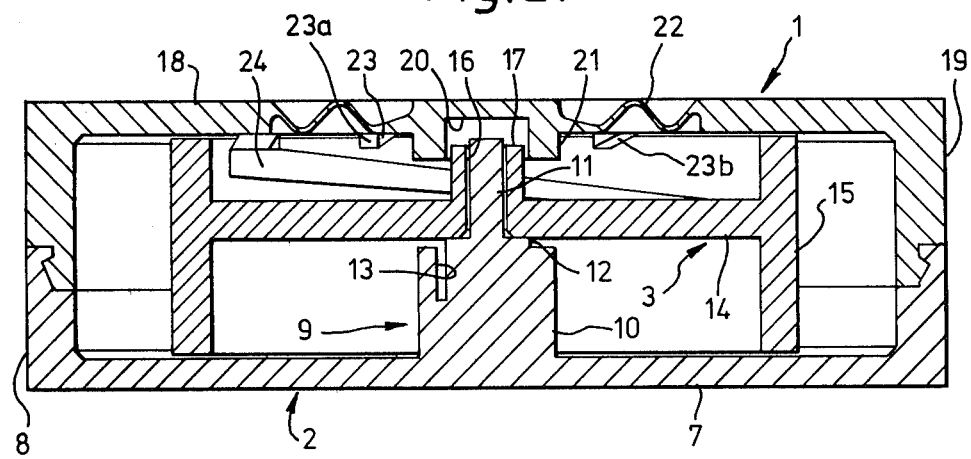
FIG. 2 is a diammetrical vertical section through the casing of the measure shown in FIG. 1.
Figure 3:
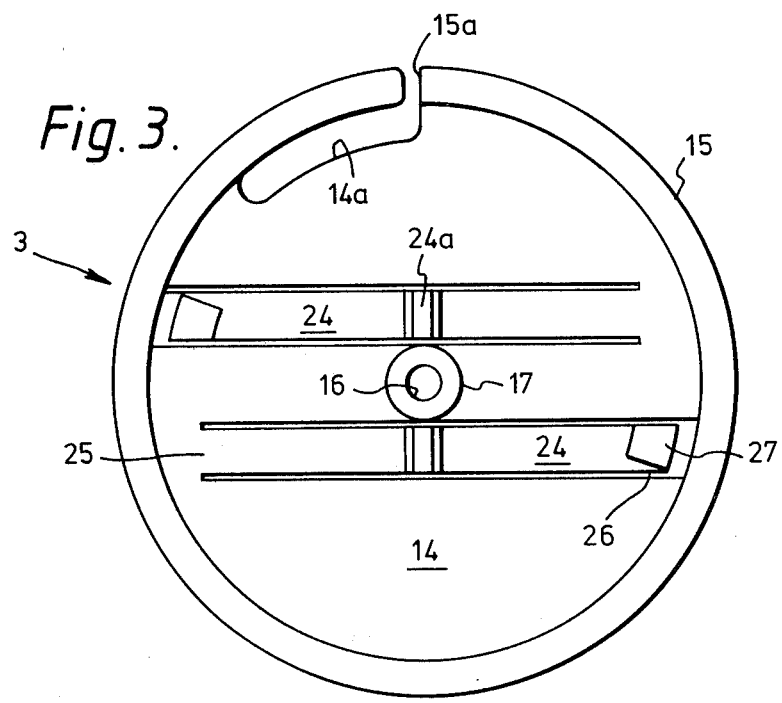
FIG. 3 is a plan view on an enlarged scale of a drum forming part of the measure shown in FIG. 1.

The tape measure illustrated in FIGS. 1 to 3 of the drawings comprises, in brief, an outer housing formed from a top shell 1 and a bottom shell 2 which are snap-fitted together and which enclose a rotatable drum 3. A graduated tape 4 is wrapped around the drum 3, and one end of the tape 4 extends through a mouth 5 in the outer housing of the tape measure. A spiral leaf spring 6 is located underneath the drum 3. One end of the spring is secured to the drum, and the other end is secured to the housing so the spring acts to return the tape 4 to the housing after the tape has been withdrawn for measuring purposes.

The tape measure will now be described in more detail with reference to FIGS. 2 and 3 of the accompanying drawings in which, for the sake of greater clarity of illustration, the tape 4 and the leaf spring 6 have been omitted.

The bottom shell 2 of the outer casing comprises a circular planar portion 7 provided with an upstanding peripheral wall 8. In order to allow the snap-fitting of the top and bottom shells referred to above, the top part of the peripheral wall 8 has a flat horizontal surface which extends outwardly from the innermost edge of the wall to an upwardly and outwardly inclined surface. This latter surface terminates in a radially inwardly-directed lip, the lip having a horizontal top surface which extends to the outermost edge of the wall.

The planar portion 7 of the bottom shell 2 is provided with a central upstanding pillar 9 of circular cross-section having a lower portion 10 which is of a greater diameter than the upper portion 11. A horizontal shoulder 12 divides the lower portion 10 of the pillar from the upper portion 11.

A short tangential slot 13 is provided in the lower portion 10 of the pillar 9 and is open at the shoulder 12 of the pillar and also at the periphery of the lower portion 10. This slot 13 is adapted to accommodate and retain one end of the spiral leaf spring 6 (not shown in FIG. 2), the remainder of the leaf spring 6 being wrapped spirally around the lower portion 10 of the pillar 9. The other end of the leaf spring 6 is attached to the drum 3 in a manner to be described.

The drum 3 comprises a horizontal plate 14 extending to approximately the vertical mid-point of an annular peripheral wall 15, formed integrally with the plate 14. A hole 16 is provided in the centre of the plate 14 of the drum 3 and, by means of this hole 16, the drum 3 is located on the shoulder 12 for rotation about the upper portion 11 of the pillar 9. An upstanding sleeve 17 surrounds the hole 16 and guides this rotation. The bottom edge of the annular wall 15 of the drum 3 lies adjacent the planar portion 7 of the bottom shell 2 and thus serves to define a space in which the leaf spring 6 is located. A vertical slot 15a is provided in the annular wall 15 and opens into an arcuate slot 14a in the plate 14 of the drum, which extends adjacent the periphery thereof. The two slots 15a, 14a are used to attach one end of the tape 4 and one end of the spring 6 to the drum 3, the said one end of the spring 6 being folded back on itself by approximately 150° and being located below the plate 14. The means of attachment may comprise eyeletting, rivetting or some other conventional means.

The top shell 1 of the casing comprises a circular generally planar portion 18 bounded by a downwardly-depending peripheral wall 19. A downwardly-opening recess 20 is provided in the centre of the underside of the planar portion 18 and is surrounded by a downwardly-depending boss 21. The recess 20 accommodates the upper part of the sleeve 17, but the sleeve 17 only extends part way into the recess 20 when the tape measure is in its usual condition. An annular region 22 of reduced thickness and having a sinuous cross-section surrounds the boss 21, and allows the central part of the top shell 1, namely the boss 21 and the recess 20, to be deformed out of the plane of the planar portion 18 of the top shell 1.

In order to provide for a snap-fit engagement of the top and bottom shells, the bottom part of the peripheral wall 19 of the top shell 1 is provided with a profile which is complementary to the profile of the top part of the peripheral wall 8 of the bottom shell 2. The bottom part of the peripheral wall 19 of the top shell 1 thus comprises: an upper horizontal face extending inwardly from the outermost edge of the shell; a vertical central face provided with an outwardly-directed protrusion having faces to engage the underside of the inwardly-directed lip of the bottom shell 2 and the said outwardly inclined surface on the bottom shell 2; and an inner horizontal face which extends to the innermost edge of the wall, at a level lower than that of the upper horizontal face. Despite the fact that the top and bottom shells are moulded from a substantially rigid plastics material, the annular flexible region 22 of the top shell 1 permits the bottom edge of the peripheral wall 19 of the top shell to be distorted inwardly in order to allow the top and bottom shells to be snap-fitted together.

The respective directions in which the leaf-spring 6 is wrapped around the central pillar 9 of the bottom shell 2 and the tape 4 is wrapped around the drum 3 are chosen so that, as the tape 4 is withdrawn from the casing, the tension in the leaf-spring 6 increases and thus the spring acts to return the tape 4 to the casing. A ratchet mechanism prevents automatic retraction of the tape into the casing when the tape is released.

A first functional part of the ratchet mechanism comprises six ratchet blocks formed integrally with the top shell 1 on the interior face thereof and arranged on a pitch diameter circle concentric with the top shell 1 and lying immediately outside the flexible region 22. Each ratchet block 23 is wedge-shaped having a vertical radial face 23a and an inclined face 23b which slopes from the lowermost extent of the vertical face 23a to the underside of the top shell 1. The ratchet blocks 23 are arranged to be radially symmetrical about the recess 20 in the top shell 1, and thus the vertical faces all face, for example, in the anti-clockwise direction.

The second functional part of the ratchet mechanism is located on the drum 3 and comprises two arms 24, located on respective sides of the sleeve 17 of the drum 3 and symmetrically with respect to that sleeve 17, each arm being a little shorter than the diameter of the plate 14 of the drum 3.

The distance between the arms 24 is less than the outer diameter of the boss 21, and the respective projections of the arms 24 onto the drum plate 14 are mutually parallel. The arms 24 are integrally moulded with the remainder of the drum 3, a first end 25 of each arm merging with the plate 14 of the drum 3 to provide a resilient connection between the arm 24 and the remainder of the drum 3.

Each arm 24 slopes upwardly from the first end 25 and terminates at a second, free, end 26 which is spaced slightly from the annular wall 15 of the drum 3. At the second end 26, each arm 24 is provided with a respective ratchet tooth or detent 27, which, like the ratchet blocks 23 on the top shell 1, is generally wedge-shaped and presents a vertical radial face and an inclined face. The vertical faces of the ratchet teeth 27 face the vertical faces of the ratchet blocks 23. By virtue of the resilient connection between each arm 24 and the remainder of the drum 3, each arm 24 is biased upwardly so that the ratchet teeth 27 touch the top shell 1, and the length of each arm 24 is chosen so that the point at which each ratchet tooth 27 touches the top shell 1 lies on the pitch diameter circle for the ratchet blocks 23. A respective upwardly-extending bump 24a with a flat top is provided at the mid-point of each arm 24. The top of the bump 24a may alternatively be radiused.

The ratchet mechanism works as follows. As the tape 4 is withdrawn from the casing of the tape measure, the drum 3 rotates within the casing and the inclined faces of the ratchet teeth 27 slip over the inclined faces 23b of the ratchet blocks 23 on the underside of the top shell 1. As each ratchet tooth slips over a ratchet block, the arm 24 on which the respective ratchet tooth 27 lies is pressed downwards and then returns to its resting position by virtue of the resilience of the connection between the arm 24 and the remainder of the drum 3. When the tape 4 is released, the leaf spring 6 will act to rotate the drum 3 with respect to the housing of the tape measure until the vertical face of each ratchet tooth 27 engages a facing vertical face on a respective ratchet block 23. The rotation of the drum 3 under the bias of the leaf spring 6 is thus arrested.

In order to release the ratchet mechanism, the central portion of the top shell 1 is pressed inwards, and the bottom edge of the boss 21 surrounding the recess 20 in the top shell will then bear upon the arms 24. The arms 24 thus move towards the remainder of the drum and the ratchet teeth 27 are disengaged from the ratchet blocks 23, allowing the drum to rotate once again. The fact that the top of the upper portion 11 of the pillar 9 extends above the top of the upstanding sleeve 17 on the drum 3 prevents excessive travel of the central part of the top shell 1 and also prevents engagement of the horizontal surface of the recess 20 in the top shell 1 with the sleeve 17. Such excessive travel might otherwise result in the eventual permanent distortion of the upper casing, and such engagement would otherwise drag on the drum 3 and impede the rewind of the tape.

When pressure on the central portion of the top shell 1 is relaxed, the central portion will move back into the plane of the top shell 1 and the ratchet teeth 27 will once more engage the ratchet blocks 23.

It can be seen that the ratchet mechanism is formed integrally with the top shell 1 and the drum 3, no separate components being necessary. It has been found that, as a consequence, a tape measure in accordance with the invention can be constructed cheaply and easily.

A further advantage may be derived from the above-described provision of an annular flexible region in the top shell 1, namely the ability to snap-fit the two shells together. It is thus unnecessary to screw or glue the two shells together, and this has been found to provide a further reduction in the cost of producing a tape measure as described above.

In an alternative embodiment (not illustrated) the central pillar 10 is tubular instead of solid and, instead of there being one tangential slot 13, there are two relatively wide radial slots cut into the wall of the pillar opposite one another, one extending down from the top of the pillar to the mid-point and the other extending for the whole height of the pillar. One end of the spring 6 is hooked around a small integrally-formed vertical pin at the base of the longer slot. The pillar is not divided into smaller and larger diameter portions and the top of the pillar is flush with the top surface of the plate 14 of the drum, so that there is no upstanding sleeve 17 on the drum. The modified tape measure is otherwise the same as that shown in FIGS. 1 to 3 of the drawings.

Figure 4:
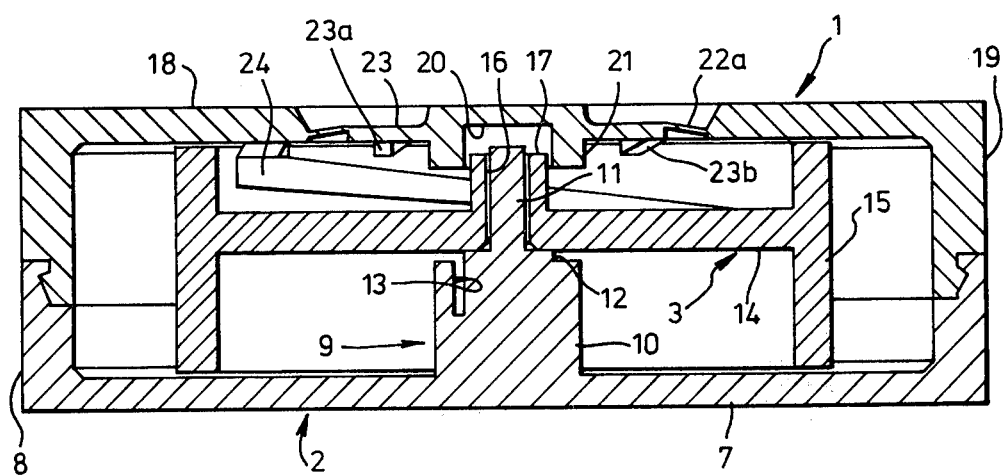
FIG. 4 is a diammetrical vertical section, corresponding to FIG. 2, showing a modified embodiment of the invention.

In a further modified embodiment, shown in FIG. 4, the structure is precisely the same as in FIGS. 1 to 3, except that the sinuous flexible region 22 is replaced by a planar outwardly inclined flexible region 22a.

Whilst the invention has been described above with reference to certain specific example, the invention is not limited thereby, and many modifications will suggest themselves to those skilled in the art, without departing from the spirit or scope of the invention.

What is claimed is:

1. A tape measure comprising: a casing formed by a first shell and a second shell; a drum mounted for rotation within the casing; a measuring tape wrapped around the drum and adapted to be withdrawn from the casing; a spring means adapted to rotate the drum to retract the tape after it has been at least partly withdrawn from the casing; and a ratchet mechanism comprising co-operating ratchet members, at least a first one of the ratchet members being on the first shell and a further ratchet member comprising at least one arm resiliently mounted at one end thereof on the drum, the arm having a free end with an abutment to engage the first ratchet member, and a disengagement means adapted to move said at least one arm from a position in which the abutment engages the first ratchet member to a retracted position in which there is no such engagement to enable rotation of the drum by the spring means.

2. A tape measure according to claim 1 wherein the said first ratchet member comprises a plurality of teeth formed integrally with the first shell and positioned in a circle substantially co-axial with the axis of rotation of the drum.

3. A tape measure according to claim 1 wherein there are two of said arms, the respective projections of the arms onto the plane of rotation of the drum being parallel to one another.

4. A tape measure according to claim 1 wherein the disengagement means comprises an area of the first shell bounded by a flexible region of the first shell and movable with respect to the remainder of the first shell, to engage said at least one arm to move said at least one arm to a position in which there is no engagement between the abutment at the free end of said one arm and the first ratchet member.

5. A tape measure according to claim 4 wherein the said flexible region is moulded integrally with, but of reduced thickness relative to, the remainder of the first shell, and the flexible region is annular and is substantially co-axial with the axis of rotation of the drum.

6. A tape measure according to claim 5 wherein the said disengagement means includes a boss member integrally formed with said area of the first shell and extending towards said at least one arm and adapted to abut and to move said at least one arm when the said area is moved towards said at least one arm.

7. A tape measure according to claim 6 wherein the said movement of said at least one arm is towards the plane of rotation of the drum.

8. A tape measure according to claim 1 wherein the casing is sufficiently flexible to allow the first and second shells to be snap-fitted together.

9. A tape measure according to claim 1 wherein said second shell includes a pillar formed integrally therewith, said drum being rotatably mounted on said pillar.

10. A tape measure according to claim 1 wherein said disengagement means is formed integrally with said first shell.

11. A tape measure according to claim 10 wherein said disengagement means comprises a substantially nonperforate area of said first shell bounded by a substantially nonperforate flexible region of said first shell, said area being movable with respect to the remainder of said first shell to engage and move said at least one arm to the retracted position.

12. A tape measure comprising a casing formed by a first shell and a second shell; a drum mounted for rotation within the casing about a pillar formed integrally with the second shell; a measuring tape wrapped around the drum and adapted to be withdrawn from the casing; a spring means adapted to rotate the drum to retract the tape after it has been at least partly withdrawn from the casing; a ratchet mechanism comprising a first ratchet member constituted by a plurality of ratchet teeth formed integrally with the first shell arranged on a circle which is substantially coaxial with the axis of rotation of the drum and at least one further ratchet member constituted by an arm resiliently mounted at one end thereof on the side of the drum facing the first shell, said arm having a free end with an abutment to engage the first ratchet member; and a disengagement means adapted to move said at least one arm from an engagement position in which it engages the first ratchet member to a retracted position in which there is no such engagement to enable rotation of the drum by the spring means, said disengagement means being constituted by an area of the first shell which is bounded by a flexible region of the first shell and which is movable with respect to the remainder of the first shell, said area being located adjacent the end of said pillar and being movable axially of the pillar to engage said at least one arm and to move said at least one arm from the engagement position to the retracted position.

13. A tape measure according to claim 12 wherein said flexible region is moulded integrally with, but is of reduced thickness relative to, the remainder of the first shell, and the flexible region is annular and is substantially coaxial with the axis of rotation of the drum and wherein the said disengagement means further includes a boss member integrally formed with said area of the first shell and extending toward said at least one arm, and is adapted to abut and move said at least one arm when said area is moved toward the further ratchet member.

14. A tape measure according to claim 12 wherein said casing includes means for snap-fitted locking engagement of said first shell with said second shell.

* * * * *